(12) United States Patent
Jun

(10) Patent No.: US 9,715,315 B2
(45) Date of Patent: Jul. 25, 2017

(54) TOUCH SCREEN DISPLAY DEVICE

(71) Applicant: Samsung Display Co., Ltd., Yongin, Gyeonggi-Do (KR)

(72) Inventor: Sang-Hyun Jun, Yongin (KR)

(73) Assignee: Samsung Display Co., Ltd., Gyeonggi-Do (KR)

(*) Notice: Subject to any disclaimer, the term of this patent is extended or adjusted under 35 U.S.C. 154(b) by 192 days.

(21) Appl. No.: 14/219,973

(22) Filed: Mar. 19, 2014

(65) Prior Publication Data
US 2014/0313438 A1    Oct. 23, 2014

(30) Foreign Application Priority Data
Apr. 19, 2013 (KR) .......................... 10-2013-0043538

(51) Int. Cl.
G06F 3/044 (2006.01)
G06F 3/041 (2006.01)

(52) U.S. Cl.
CPC ............ G06F 3/044 (2013.01); G06F 3/0412 (2013.01)

(58) Field of Classification Search
CPC . G06F 2203/04103; G06F 2203/04102; G06F 3/047; G06F 2203/04106; G02F 1/1368; G09G 2300/023; G09G 3/3233
See application file for complete search history.

(56) References Cited

U.S. PATENT DOCUMENTS

| 7,663,607 | B2 | 2/2010 | Hotelling et al. | |
|---|---|---|---|---|
| 2012/0249454 | A1* | 10/2012 | Teraguchi et al. | 345/173 |
| 2013/0076691 | A1* | 3/2013 | Liu | G06F 3/0412 345/174 |

FOREIGN PATENT DOCUMENTS

JP    09-305292 A    11/1997

* cited by examiner

*Primary Examiner* — Tracie Y Green
(74) *Attorney, Agent, or Firm* — Knobbe, Martens, Olson & Bear, LLP

(57) ABSTRACT

A touch screen display device is disclosed. One innovative aspect includes a plurality of pixels, a plurality of first touch electrodes, a first connecting portion and a plurality of second touch electrodes. Each pixel includes an emission layer electrically connected to the first touch electrodes. The first touch electrodes are spaced apart from each other and the second touch electrodes. The first connecting portion connects between the first touch electrodes and has a resistance greater than that of each first touch electrode.

20 Claims, 3 Drawing Sheets

TOUCH SCREEN DISPLAY DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2013-0043538, filed on Apr. 19, 2013, in the Korean Intellectual Property Office, the entire contents of which are incorporated herein by reference in their entirety.

BACKGROUND

Field

The described technology generally relates to a low-resistance touch screen display device with integrated cathode electrode and touch electrode.

Description of the Related Technology

A touch screen display device is a device which can display a screen and simultaneously receives a user's command by recognizing touches on the screen by the user.

Since such a touch screen display device does not require a separate input device like a keyboard or mouse, it can be useful for portable and mobile applications.

Traditionally, a touch screen display device was manufactured by separately producing a display device and a touch sensor, separately, and then attaching the touch sensor to the display device.

For example, a method for implementing a touch sensor could be by a resistive overlay method, a photo sensing method, a capacitive overlay method, or the like. Recently, a capacitive overlay touch sensor with easy multi-touch detection and excellent accuracy has come into widespread use.

SUMMARY OF CERTAIN INVENTIVE ASPECTS

One innovative aspect of the disclosed technology includes a touch screen display with low resistance. The touch screen display includes a cathode electrodes used as a touch electrode.

Another innovative aspect includes a touch screen display device, including: a plurality of pixels each configured to include an emission layer, a plurality of first touch electrodes electrically connected to the emission layers of the pixels, the first touch electrodes being spaced apart from each other, a first connecting portion configured to connect between the first touch electrodes, and a plurality of second touch electrodes positioned to be spaced apart from the first touch electrodes, wherein the first connecting portion has a resistance greater than that of each first touch electrode.

Each first touch electrode can be electrically connected to each emission layer of pixels positioned on at least one row.

The second touch electrodes can be positioned in a direction intersecting the first touch electrodes.

The second touch electrodes can be driven, together with the first touch electrodes, as a capacitive touch sensor.

The first touch electrodes can sequentially receive a touch driving signal during a first period, and receive the same voltage during a second period.

The first and second periods can be alternately repeated.

The first connecting portion can have a resistance of 10 MΩ or more.

The touch screen display device can further include a second connecting portion configured to connect between the second touch electrodes.

The second connecting portion can have a resistance greater than that of the second touch electrode.

The touch screen display device can further include an insulating member between the first touch electrodes and the second touch electrodes.

BRIEF DESCRIPTION OF THE DRAWINGS

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
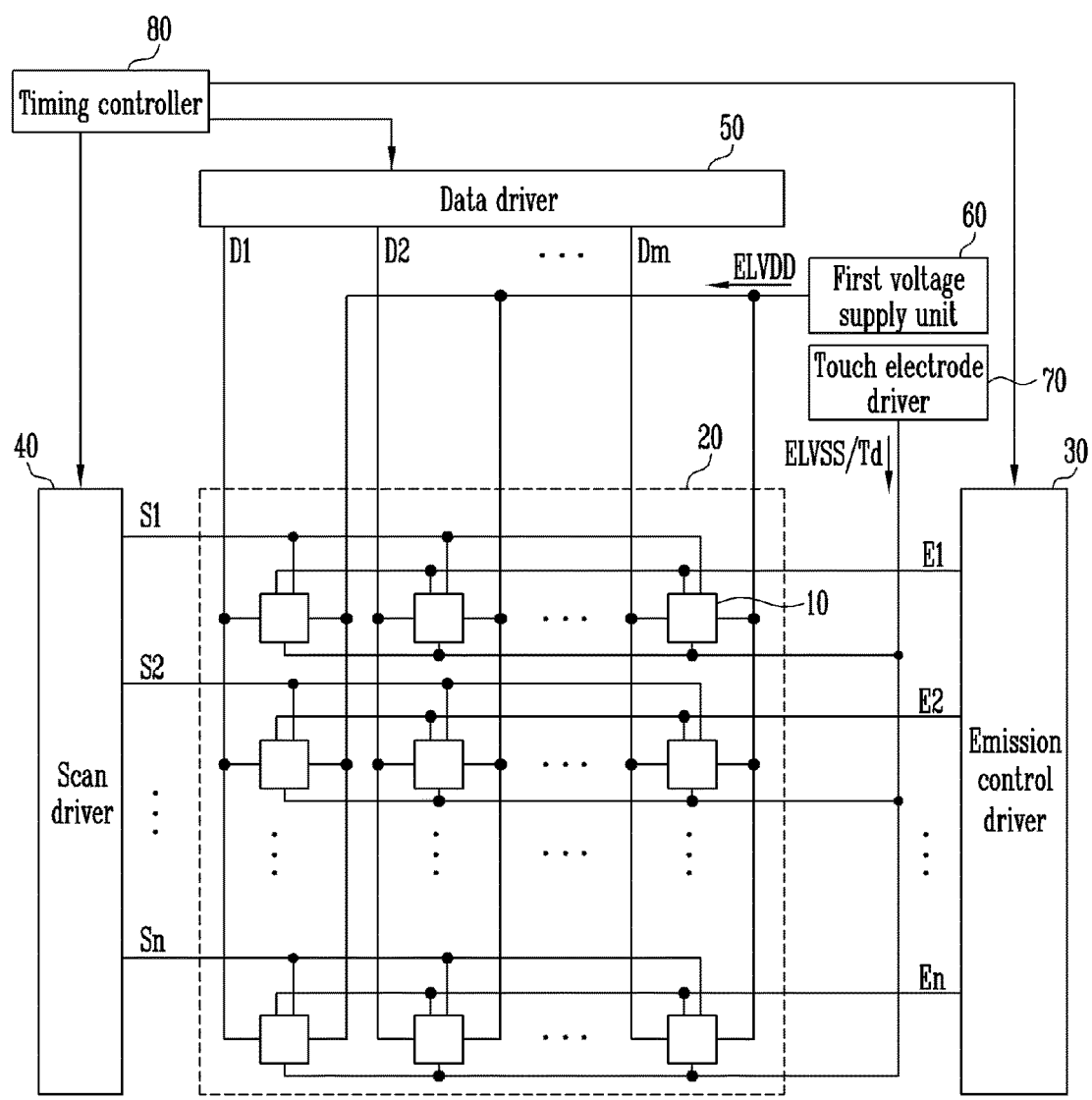
FIG. 1 is a diagram illustrating a pixel unit of a touch screen display device according to an embodiment of the disclosed technology.

Hereinafter, certain exemplary embodiments according to the disclosed technology will be described with reference to the accompanying drawings. Here, when a first element is described as being electrically connected to a second element, the first element may be not only directly electrically connected to the second element but may also be indirectly electrically connected to the second element via a third element. Further, some of the elements that are not essential to the complete understanding of the invention are omitted for clarity. Also, like reference numerals refer to like elements throughout.

Existing touch screen display methods require a separate manufacturing process of a touch sensor. Therefore, the methods are inefficient in terms of process time and cost. In addition, as the touch sensor is attached to an outer surface of a display device, the entire thickness of the display device increases.

In order to solve such problems, it is required that the touch sensor and the display device be integrally formed.

FIG. 1 is a diagram illustrating a pixel unit of a touch screen display device according to an embodiment of the disclosed technology.

Referring to FIG. 1, the touch screen display device according to this embodiment may include a pixel unit 20, an emission control driver 30, a scan driver 40, a data driver 50, a first voltage supply unit 60, a touch electrode driver 70 and a timing controller 80.

The pixel unit 20 may include a plurality of pixels 10 respectively electrically connected to the scan lines S1 to Sn, data lines D1 to Dm, and control lines E1 to En.

Each pixel 10 may receive a scan signal supplied through a scan line, receive a data signal supplied through a data line, and receive a control signal supplied through a control line.

Each pixel may receive first and second voltages ELVDD and ELVSS, and the touch electrode driver 70. The first and second voltages ELVDD and ELVSS are supplied from the first power supply unit 60, respectively.

In this case, each pixel 10 generates light, corresponding to a data signal by means of current flowing from the first voltage ELVDD to the second voltage ELVSS via an organic light emitting diode.

The emission control driver 30 supplies a control signal to each pixel 10 through the control lines E1 to En.

In one exemplary implementation, the emission control driver 30 generates a control signal under the control of the timing controller 80. The emission control driver outputs the generated control signal to the control lines E1 to En.

The control signal is used to control whether the pixel 10 emits light. The control signal includes an emission signal and a non-emission signal.

In another exemplary implementation, the pixel 10 receiving the emission signal performs an emission operation. The pixel 10 receiving the non-emission signal performs a non-emission operation.

Although it has been illustrated in FIG. 1 that the emission control driver 30 is separated from the scan driver 40, the emission control driver 30 may be included in the scan driver 40.

The scan driver 40 may supply a scan signal to each pixel 10 through the scan lines S1 to Sn.

In some exemplary implementations, the scan driver 40 generates a scan signal under the control of the timing controller 80. The scan driver 40 outputs the generated scan signal to the scan lines S1 to Sn.

The data driver 50 may supply a data signal to each pixel 10 through the data lines D1 to Dm.

In some other implementations, the data driver 50 generates a data signal under the control of the timing controller 80. The data driver 50 outputs the generated data signal to the data lines D1 to Dm.

The first voltage supply unit 60 may supply the first voltage ELVDD to each pixel 10.

In one exemplary implementation, the first voltage supply unit 60 is a DC-DC converter. The DC-DC converter converts a voltage supplied from an outside into the first voltage ELVDD.

The touch electrode driver 70 may supply the second voltage ELVSS to each pixel 10. In this case, the second voltage ELVSS may be supplied to each pixel 10 through a first touch electrode 110 described later.

The touch electrode driver 70 may supply a touch driving signal Td to the first touch electrode 110.

The timing controller 80 may perform a function of controlling the emission control driver 30, the scan driver 40, the data driver 50, a first voltage supply unit 60 and the touch electrode driver 70.

Figure 2:
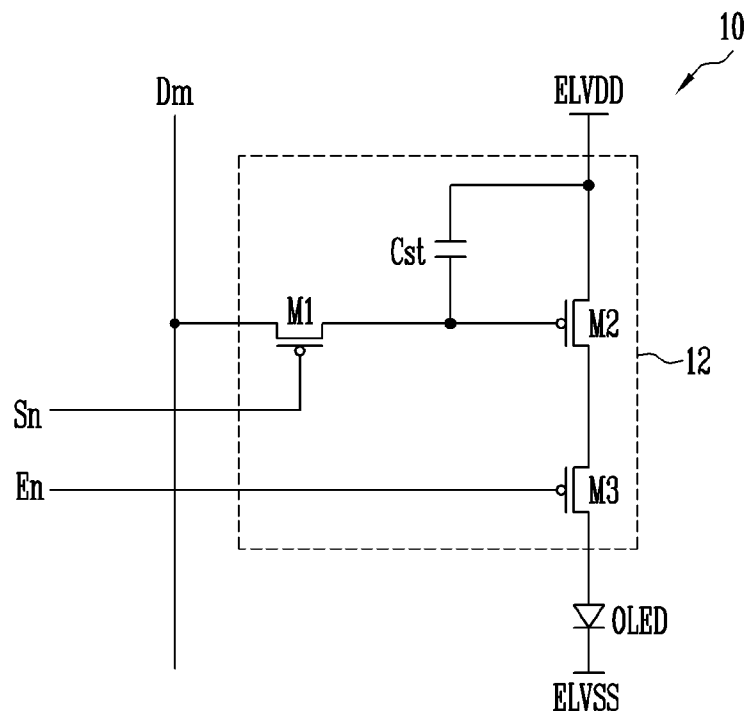
FIG. 2 is a circuit diagram illustrating an embodiment of a pixel shown in FIG. 1.

FIG. 2 is a circuit diagram illustrating an embodiment of a pixel shown in FIG. 1. Particularly, for convenience of illustration, a pixel electrically connected to an n-th scan line Sn, an m-th data line Dm and an n-th control line En will be shown in FIG. 2.

Referring to FIG. 2, each pixel 10 includes an organic light emitting diode OLED, and a pixel circuit 12. The pixel circuit 12 is electrically connected to the scan line Sn, the data line Dm and the control line En. The pixel circuit 12 controls the amount of current flowing through the organic light emitting diode OLED.

The organic light emitting diode OLED may be electrically connected between the pixel circuit 12 and the second voltage ELVSS.

In another exemplary implementations, an anode electrode of the organic light emitting diode OLED is electrically connected to the pixel circuit 12. A cathode electrode of the organic light emitting diode OLED is electrically connected to the second voltage ELVSS.

The organic light emitting diode OLED may generate light with a predetermined luminance, corresponding to current supplied from the pixel circuit 12.

The pixel circuit 12 controls the amount of current supplied to the organic light emitting diode OLED, corresponding to a data signal supplied to the data line Dm when a scan signal is supplied to the scan line Sn.

In some exemplary implementations, the pixel circuit 12 includes a first transistor M1, a second transistor M2, a third transistor M3 and a storage capacitor Cst. The first transistor M1 is electrically connected to the second transistor M2, the data line Dm and the scan line Sn. The second transistor M2 is electrically connected to the first voltage ELVDD and the third transistor M3. The third transistor M3 is electrically connected to the second transistor M2 and the organic light emitting diode OLED. The storage capacitor Cst is electrically connected to a gate electrode and a first electrode of the second transistor M2.

A gate electrode of the first transistor M1 is electrically connected to the scan line Sn, and a first electrode of the first transistor M1 is electrically connected to the data line Dm.

A second electrode of the first transistor M1 is electrically connected to one terminal of the storage capacitor Cst.

Here, the first electrode is set as any one of source and drain electrodes. The second electrode is set as the other electrode different from the first electrode. In one exemplary implementation, if the first electrode is set as a source electrode, the second electrode is set as a drain electrode.

The first transistor M1 is electrically connected to the scan line Sn and the data line Dm. When the scan signal is supplied to the scan line Sn, the first transistor M1 is turned on and supplies a data signal from the data line Dm to the storage capacitor Cst. In this case, the storage capacitor Cst charges a voltage corresponding to the data signal.

The gate electrode of the second transistor M2 is electrically connected to the one terminal of the storage capacitor Cst, and the first electrode of the second transistor M2 is electrically connected to the other terminal of the storage capacitor Cst and the first voltage ELVDD. A second electrode of the second transistor M2 is electrically connected to a first electrode of the third transistor M3.

The second transistor M2 controls the amount of current flowing from the first voltage ELVDD to the second voltage ELVSS via the organic light emitting diode OLED, corresponding to the voltage stored in the storage capacitor Cst.

A first electrode of the third transistor M3 is electrically connected to the second transistor M2. A second electrode of the third transistor M3 is electrically connected to the organic light emitting diode OLED. A gate electrode of the third transistor M3 is electrically connected to the control line En.

In this implementation, the third transistor M3 is turned on when an emission signal is supplied to the control line En. The third transistor M3 is turned off when a non-emission signal is supplied to the control line En.

In some implementations where the third transistor M3 is turned on, pixel current supplied from the second transistor M2 flows through the organic light emitting diode OLED, and therefore, the organic light emitting diode OLED performs an emission operation.

In one implementation where the third transistor M3 is turned off, the pixel current supplied from the second transistor M2 does not flow through the organic light emitting diode OLED. Therefore, the organic light emitting diode OLED does not emit light.

As described above, the on-off operation of the third transistor M3 is controlled, so that it is possible to control the emission or non-emission of each pixel 10.

The pixel structure of FIG. 2 described above is merely an embodiment of the disclosed technology. The pixel 10 of the disclosed technology is not limited to the pixel structure. Actually, the pixel circuit 12 has the structure of a circuit capable of supplying current to the organic light emitting diode OED. The pixel circuit 12 may be selected as any one of various structures current known in the art.

Figure 3:
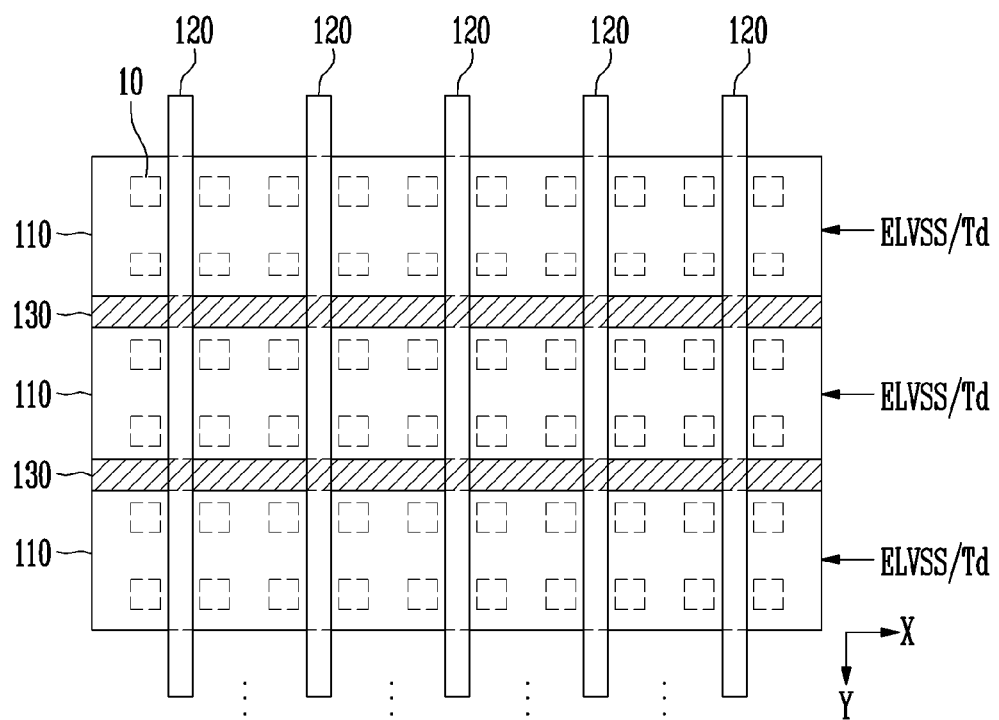
FIG. 3 is a diagram illustrating first and second touch electrodes of the touch screen display device according to the embodiment of the disclosed technology.
Figure 4:
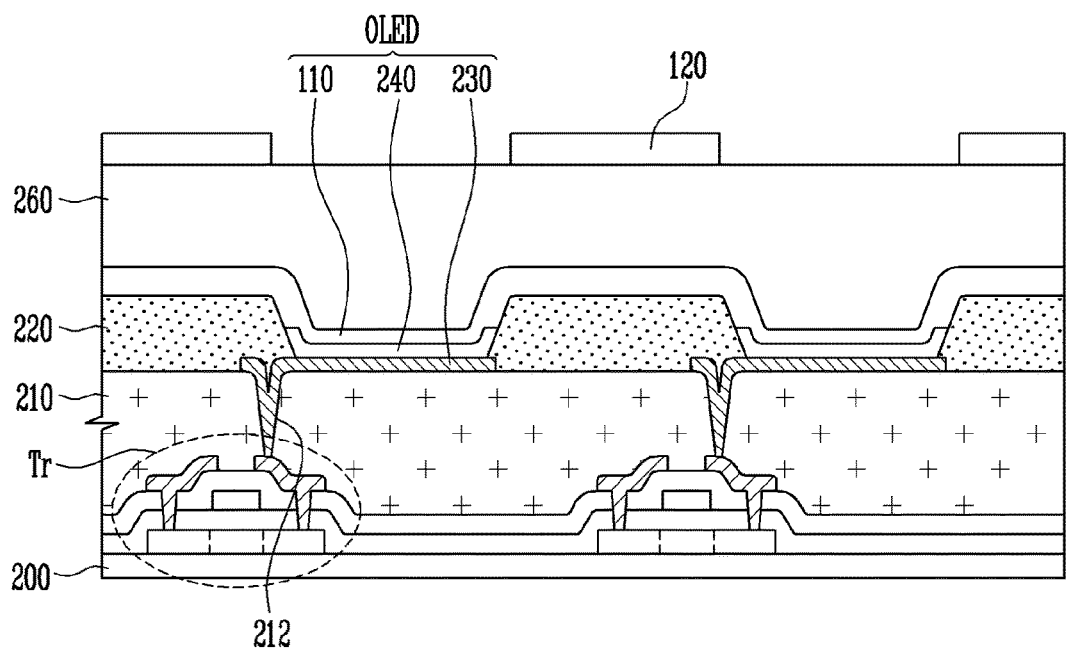
FIG. 4 is a main portion sectional view of the touch screen display device according to the embodiment of the disclosed technology.

FIG. 3 is a diagram illustrating first and second touch electrodes of the touch screen display device according to the embodiment of the disclosed technology. FIG. 4 is a main portion sectional view of the touch screen display device according to the embodiment of the disclosed technology.

A plurality of pixels 10 may be formed on a substrate 200. In this case, the substrate 200 may be made of a material having an insulation property, such as glass, plastic or synthetic resin.

The substrate 200 may be implemented with a film having flexibility to be bendable or foldable.

For convenience of illustration, only a transistor Tr directly electrically connected to an organic light emitting diode OLED has been shown in FIG. 4.

In another exemplary implementation, the transistor Tr is the third transistor M3 of the pixel 10 shown in FIG. 2.

In addition, the transistors, the capacitor and the like, which constitute the pixel circuit 12, may be positioned on the substrate 200, and the scan lines S1 to Sn, the data lines D1 to Dm, the control lines E1 to En, and the like may also be positioned on the substrate 200.

A planarization layer 210 may be positioned on the transistor Tr. The planarization layer 210 may be formed of an insulating material such as a nitride or oxide.

An anode electrode 230 electrically connected to the transistor Tr through a contact hole 212 may be positioned in the planarization layer 210. Accordingly, the anode electrode 230 can be electrically connected to the pixel circuit 12.

The anode electrode 230 may constitute, together with an emission layer 240 and a first touch electrode 110, the organic light emitting diode OLED.

A pixel defining layer 220 may be formed on the planarization layer 210 so that at least a partial region of the anode electrode 230 is exposed.

The pixel defining layer 220 may be made of any one of an acrylic organic compound and an organic insulating material such as polyamide or polyimide. However, the disclosed technology is not limited thereto. That is, the pixel defining layer 220 may be formed of various insulating materials.

The anode electrode 230 may be formed of various conductive materials, etc.

The emission layer 240 may be formed on the anode electrode 230 exposed to an outside through the pixel defining layer 220.

The emission layer 240 includes an organic emission layer for self-luminescence.

In this implementation, the emission layer 240 is formed into a structure in which a hole transporting layer, an organic emission layer and an electron transporting layer are laminated. The emission layer 240 may further include a hole injection layer and an electron injection layer.

The first touch electrode may be positioned on the emission layer 240. Thus, the first touch electrode can perform the function of a cathode electrode of the organic light emitting diode OLED.

Accordingly, holes injected from the anode electrode 230 and electrons injected from the first touch electrode 110 are combined in the emission layer 240, thereby forming excitons, and light of a specific wavelength can be generated in each emission layer 240 by energy from the formed excitons.

In the touch screen display device according to this embodiment, the first touch electrode 110 divided into a plurality of first touch electrodes may simultaneously perform the function of a cathode electrode receiving the second voltage ELVSS and the function of a touch electrode receiving a touch driving signal Td.

To this end, each first touch electrode 110 may time-divisionally receive the second voltage ELVSS for the normal emission of the emission layer 240 and the touch driving signal Td for driving the first touch electrode 110 as a touch sensor.

In some exemplary implementations, the touch electrode driver 70 sequentially supplies the touch driving signal Td to the first touch electrodes 110 during a first period, and simultaneously supplies the constant second voltage ELVSS to the first touch electrodes 110 during a second period. In this case, the first and second periods are alternately repeated.

The first touch electrode 110 may be formed to be divided into a plurality of patterns as shown in FIG. 3.

In one exemplary implementation, the first touch electrode 110 is formed long in a first direction (e.g., an X-axis direction) so that a plurality of first touch electrodes can be arranged along a second direction (e.g., a Y-axis direction) intersecting the first direction.

Each first touch electrode 110 may be electrically connected to each emission layer 240 of pixels 10 positioned on at least one row.

In another exemplary implementation, it has been illustrated in FIG. 3 that one first touch electrode 110 is electrically connected to each emission layer 240 of pixels 10 positioned on two rows.

The first touch electrode 110 is formed of a transparent conductive material so that the light emitted from the emission layer 240 is well transmitted therethrough. However, the first touch electrode 110 may be formed of another conductive material such as an opaque metal.

In some exemplary implementations, the first touch electrode 110 may be formed of indium tin oxide (ITO), indium zinc oxide (IZO), graphene, carbon nanotube, silver nanowires (AgNWs), etc.

In one exemplary implementation where the cathode electrode of the organic light emitting diode OLED, which conventionally had one plate shape, was divided into a plurality of electrodes in order to use the cathode electrode as a touch electrode of a touch sensor, the resistance of each electrode increased, and accordingly, a voltage drop occurred.

Therefore, the touch screen display device according to this embodiment includes first connecting portions 130 configured to connect between the first touch electrodes 110.

That is, the first connecting portion 130, as shown in FIG. 3, connects between the first touch electrodes 110 by being positioned between the first touch electrodes 110.

However, the first touch electrodes 110 necessarily operate to be electrically separated during a touch sensing period (e.g., the first period) in which the touch driving signal Td is supplied to the first touch electrodes 110. Therefore, the resistance of the first connecting portion 130 is greater than that of the first touch electrode 110.

In one exemplary implementation where the first touch electrodes 110 are scanned at a high frequency of 1 kHz or more during the touch sensing period, the first connecting portion 130 has the high resistance and operates like a non-conductive material for a short time.

In this case, the resistance of the first connecting portion 130 is set to 10 MΩ or more.

In one implementation where the second voltage ELVSS for the normal emission of each pixel 10 is supplied to the first touch electrodes 110 during an emission period (e.g., the second period), the second voltage ELVSS is a DC voltage. Therefore, current may flow in the first connecting portion 130.

Thus, it is possible to reduce an increase in resistance generated as the cathode electrode is divided into the first touch electrodes 110.

In one implementation where the first touch electrodes 110 are physically patterned, the first connecting portion 130 is formed by depositing a high-resistance material between the first touch electrodes 110.

However, the first connecting portion 130 may be formed without passing through the process of physically patterning the first touch electrodes 110.

In another exemplary implementation, a partial area of one electrode plate is formed as a high-resistance area through a laser, plasma or chemical treatment.

In this implementation, the high-resistance area acts as the first connecting portion 130. The area divided by the first connecting portion 130 acts as the first touch electrode 110.

Second touch electrodes 120 are positioned to be spaced apart from the first touch electrodes 110, so that the first touch electrodes 110 and the second touch electrodes 120 can be driven as a capacitive touch sensor.

To this end, the second touch electrodes 120 may be positioned in a direction intersecting the first touch electrodes 110.

In some exemplary implementations, the second touch electrode 120 is formed long so that a plurality of second touch electrodes can be arranged along the first direction.

Thus, mutual capacitance exists between the first and second touch electrodes 110 and 120, and a touch position can be detected by sensing a change in capacitance, caused by a touch, through the second touch electrode 120.

In order to sense user's multiple touches, the touch driving signal Td may be sequentially supplied to the first touch electrodes 110.

That is, the normal second voltage ELVSS may be supplied to the first touch electrodes 110 during a period in which an image is displayed, and the touch driving signal Td may be supplied to the first touch electrodes 110 during a period in which a touch is detected.

In this case, the second touch electrode 120 is formed of a transparent conductive material. However, the second touch electrode 20 may be formed of another conductive material such as an opaque metal.

In one exemplary implementation, the second touch electrode 120 is formed of ITO, IZO, graphene, carbon nanotube, AgNWs, etc.

In some implementations where the second touch electrodes 120 are formed of an opaque metal in order to increase touch sensitivity by lowering the resistance of the second touch electrodes 120, the second touch electrodes 120 are positioned to overlap with the pixel defining layer 220 as shown in FIG. 4.

Accordingly, the second touch electrodes 120 are not overlapped with the emission layer 240, thereby improving visibility.

The first and second touch electrodes 110 and 120 are necessarily separated from each other at a predetermined distance. To this end, an insulating member 260 may be interposed between the first and second touch electrodes 110 and 120.

In a case where the insulating member 260 is positioned on the first touch electrodes 110 as shown in FIG. 4, the second touch electrodes 120 may be positioned on the upper surface of the insulating member 260.

The insulating member 260 may be formed into not only a single-layered structure but also a multi-layered structure.

Unlike FIG. 4, the insulating member 260 may be positioned while being spaced apart from the first touch electrodes 110. In this case, the second touch electrodes 120 may be positioned on not only the upper surface but also the lower surface of the insulating member 260.

Figure 5:
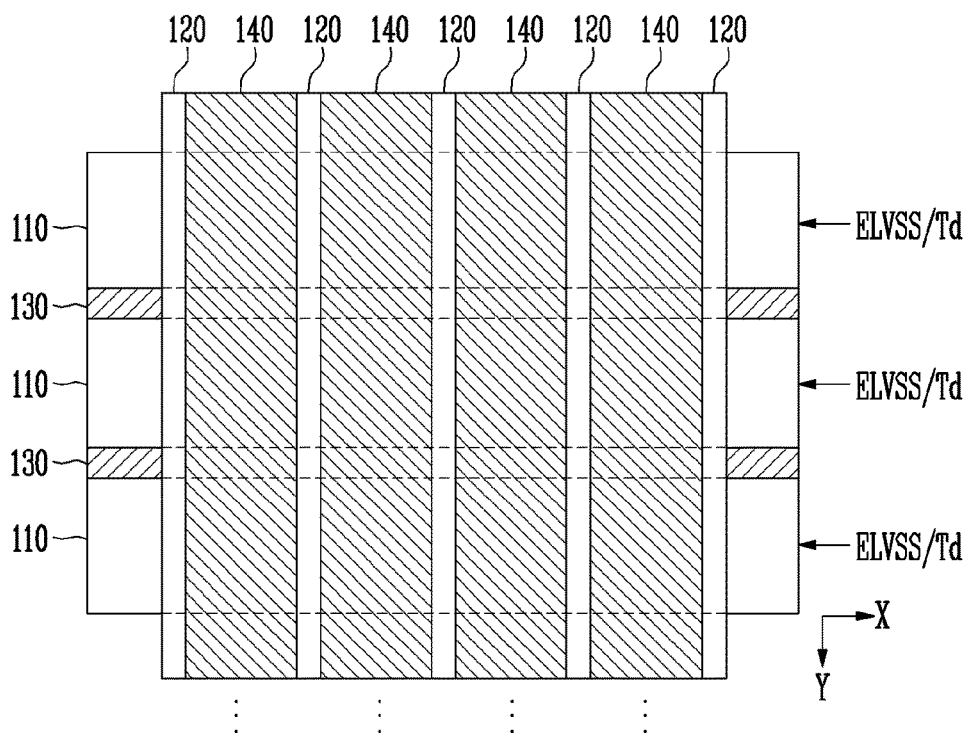
FIG. 5 is a diagram illustrating first and second touch electrodes of a touch screen display device according to another embodiment of the disclosed technology.

FIG. 5 is a diagram illustrating first and second touch electrodes of a touch screen display device according to another embodiment of the disclosed technology.

Referring to FIG. 5, the touch screen display device according to this embodiment may further include second connecting portions 140.

That is, as compared with the embodiment shown in FIG. 3, the second connecting portions 140 for connecting between second touch electrodes 120 may be additionally provided.

Thus, the second touch electrode 120 and the second connecting portion 140 can act as an anti-static electricity layer.

In this case, the second connecting portion 140 has a resistance greater than that of each second touch electrode 120 in order not to interrupt operations of the second touch electrodes 120.

The forming method of the second connecting portion 140 may be substantially identical to that of the first connecting portion 130 described above.

By way of summation and review, according to the disclosed technology, one inventive aspect includes a touch screen display device in which a cathode electrode is used as a touch electrode, thereby simplifying the structure of the touch screen display device.

Further, it is possible to provide a touch screen display device in which a connecting portion for connecting between touch electrodes is provided, thereby lowering the resistance of the touch electrodes.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosed technology as set forth in the following claims.

What is claimed is:

1. A touch screen display device, comprising:
   a plurality of pixels, each pixel including an emission layer;
   a plurality of first touch electrodes electrically connected to the emission layers of the pixels, the first touch electrodes being spaced apart from each other;
   a first connecting portion electrically connecting adjacent ones of the first touch electrodes; and
   a plurality of second touch electrodes positioned to be spaced apart from the first touch electrodes,
   wherein the first connecting portion has a resistance greater than that of each first touch electrode.

2. The touch screen display device of claim 1, wherein each first touch electrode is electrically connected to each emission layer of pixels positioned on at least one row.

3. The touch screen display device of claim 1, wherein the second touch electrodes are formed in a direction intersecting the first touch electrodes.

4. The touch screen display device of claim 3, wherein the second touch electrodes are driven, together with the first touch electrodes, as a capacitive touch sensor.

5. The touch screen display device of claim 1, wherein the first touch electrodes sequentially receive a touch driving signal during a first period and receive the same voltage during a second period.

6. The touch screen display device of claim 5, wherein the first and second periods are alternately repeated.

7. The touch screen display device of claim 1, wherein the first connecting portion has a resistance greater than or equal to 10 MΩ.

8. The touch screen display device of claim 1, further comprising a second connecting portion configured to connect between the second touch electrodes.

9. The touch screen display device of claim 1, wherein the second connecting portion has a resistance greater than that of the second touch electrode.

10. The touch screen display device of claim 1, further comprising an insulating member formed between the first touch electrodes and the second touch electrodes.

11. The touch screen display device of claim 1, wherein the length of the first connecting portion is substantially the same as the length of each of the first touch electrodes.

12. The touch screen display device of claim 1, wherein each of the first touch electrodes is configured to function as a cathode and a touch electrode for the corresponding pixel.

13. A display device, comprising a plurality of touch sensitive pixels, each touch sensitive pixel including:
   a cathode electrode;
   an anode electrode;
   an emission layer formed on the anode electrode, the emission layer electrically connected to the cathode electrode, wherein the cathode electrodes of the pixels are spaced apart from each other, and wherein each of the cathode electrodes is configured to function as a cathode and a first touch electrode for the corresponding pixel;
   a first connecting portion electrically connecting adjacent ones of the cathode electrodes; and
   a plurality of second touch electrodes positioned to be spaced apart from the cathode electrodes,
   wherein the first connecting portion has a resistance greater than that of each cathode electrode.

14. The display device of claim 13, wherein the second touch electrodes are formed in a direction intersecting the cathode electrodes.

15. The display device of claim 13, wherein the cathode electrodes sequentially receive a touch driving signal during a first period and receive the same voltage during a second period.

16. The display device of claim 13, wherein the first connecting portion has a resistance greater than or equal to 10 MΩ.

17. The display device of claim 13, further comprising a second connecting portion configured to connect between the second touch electrodes.

18. The display device of claim 13, wherein the second connecting portion has a resistance greater than that of the second touch electrodes.

19. The display device of claim 13, further comprising an insulating member formed between the cathode electrodes and the second touch electrodes.

20. The display device of claim 13, wherein the cathode is divided into a plurality of electrodes.

* * * * *